Dec. 24, 1940.   G. T. JACOCKS   2,226,495
CLOSURE
Filed April 22, 1939   2 Sheets-Sheet 2
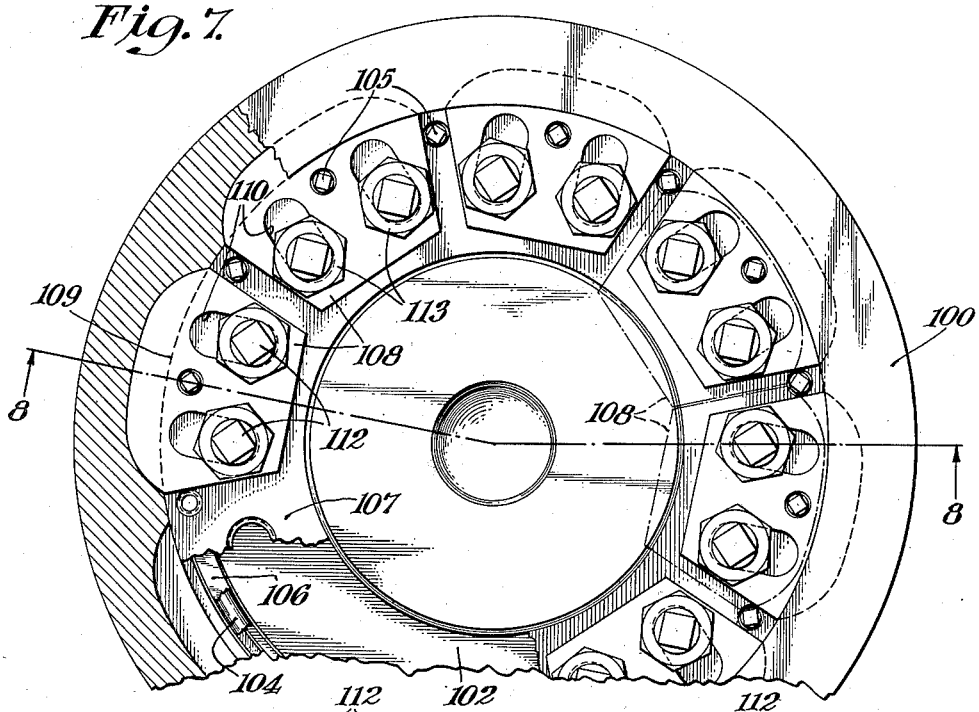
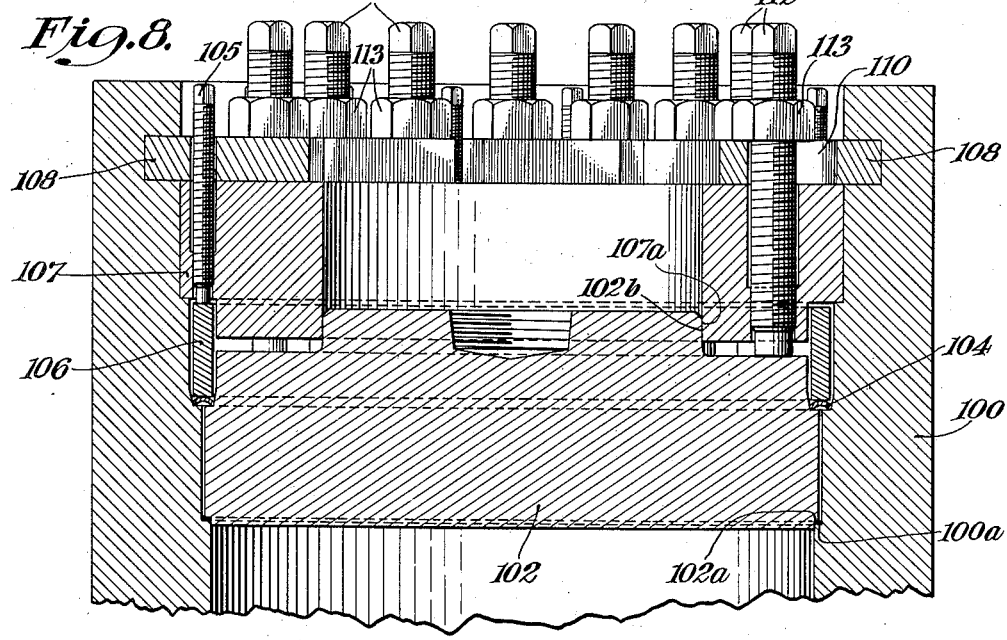
INVENTOR
George T. Jacocks
BY
ATTORNEY Patented Dec. 24, 1940

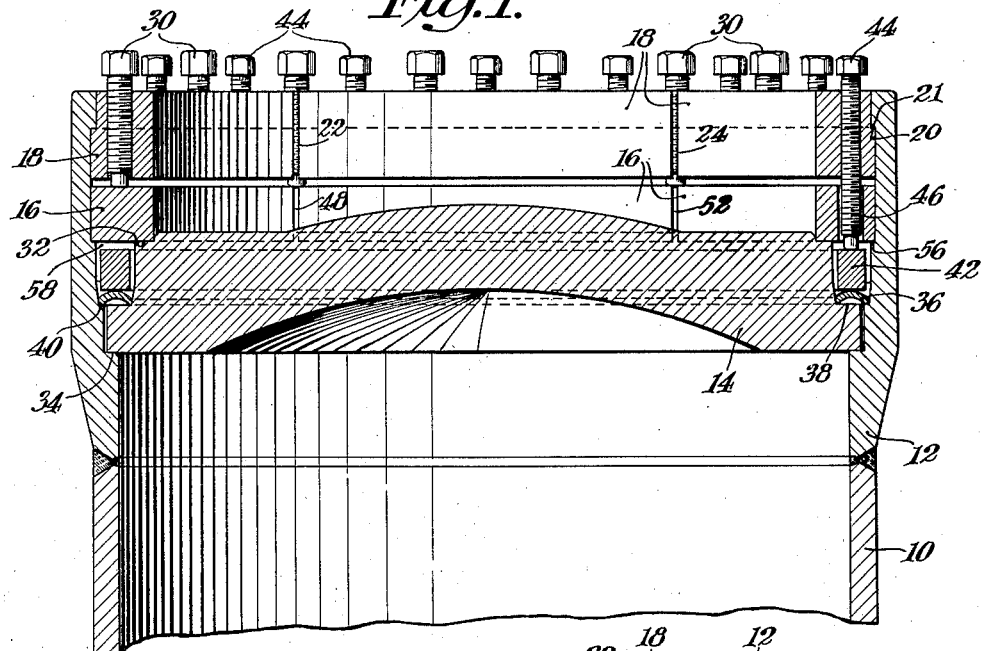

2,226,495

UNITED STATES PATENT OFFICE 2,226,495

CLOSURE

George T. Jacocks, Larchmont, N. Y., assignor to The Lummus Company, New York, N. Y., a corporation of Delaware Application April 22, 1939, Serial No. 269,459

6 Claims. (Cl. 220—46)

The present invention pertains to closures for high-pressure vessels, and is particularly concerned with improving the efficiency of the sealing means and the means for retaining the closure member or head of such a vessel.

In a tubular container or pressure vessel in which the gross load on the closure member is great because of the high pressure and large area, a serious problem arises in connection with the necessary use of threaded bolts for holding the closure member or head and for applying suitable sealing pressure to the gasket. It is extremely difficult to provide sufficient bolts of adequate capacity which will fit within the required circumferential limits. If the same set of bolts is used for both purposes, their irregular thermal expansion in use will impair the gasket seal. Proper division of the stress on the circumferentially disposed bolts or other threaded head-retaining means is another phase of the general problem. Furthermore, to reduce equipment cost, the closure should be within the inner diameter of the vessel and the means for applying pressure to the head and gasket must also lie within the inner diameter of the tubular member.

Therefore, the object of this invention is to meet the problem which has been outlined.

More specifically stated, the object of the invention is to provide satisfactory means for retaining the removable head of a high-pressure vessel such as a heat exchanger and for maintaining the gasket seal thereof under all conditions of use.

A further object of the invention is the provision of a pressure head construction having closure parts which are unusual in their compactness, strength, simplicity, ease of assembly, and economy of manufacture and maintenance.

Another and more specific object of the invention is to provide an improved closure for a vessel in which the gasket is individually sealed under a known deflection pressure and the closure is separately held with a known resistance for the desired loading, such device being of especial value in high pressure constructions.

The foregoing and other novel features and advantages of the invention will be better understood and appreciated from reading the following detailed description of preferred forms of embodiment thereof in connection with the accompanying drawings, in which Fig. 1 is a partial longitudinal section of a pressure vessel and head taken on line 1—1 of Fig. 2;

Fig. 2 is a top plan view of the vessel and head therefor;

Fig. 3 is a perspective view of a modified form of retaining element;

Fig. 4 is a fragmentary longitudinal section of vessel and head illustrating the use of the modified form of retaining element;

Fig. 5 represents the parts of the Fig. 4 modification in different relative positions; and Fig. 6 shows a further modification in fragmentary longitudinal section.

Fig. 7 is a partial plan view, with parts broken away to show the internal structure, of a still further modified form of construction, and, Fig. 8 is a vertical section of the structure shown in Fig. 7, and taken along the line 8—8 thereof.

As shown in Fig. 1, a vessel or cylindrical shell 10 has integrally secured thereto an extension sleeve 12 of somewhat greater external diameter and thickness. Other elements of the assembly are a dome pressure head or cover member 14 which closes the open end of the vessel 10, an intermediate circular ring 16, and a circular retaining or bull ring 18.

The bull ring 18 is provided on its outer circumferential face with a deep narrow shoulder 20 which engages an inwardly extending thrust shoulder 21 at the outer end of the sleeve 12. In order to facilitate assembly, the ring 18 may be divided into a plurality of segments by the parallel cuts 22, 24 and 26, 28, best illustrated in Fig. 2. A series of headed stud bolts 30 are uniformly spaced circumferentially of the bull ring 18, and are threaded therethrough so that their bearing ends will engage the underlying intermediate ring 16. Each of the cuts 22, 24, 26, 28 is spanned by one of the bolts 30, one half of the threaded opening therefor being on each side of the cut.

An inspection of Fig. 1 will show that the intermediate ring 16 engages the head 14 throughout a flat circumferential shoulder 32 at the outer margin of the top of said head. The lower marginal portion of the cover or head 14 is in continuous, closing engagement with shoulder 34, also extending inwardly of the extension sleeve 12.

Means for providing a fluid-tight seal are shown in Fig. 1. Such means comprises a curved, circular sealing ring or gasket 36. The ring 36 is of concave cross-section and of uniform thickness, with its concave face turned downwardly and its inner and outer edges resting upon substantially coplanar shoulders 38 and 40 in the upper surface of the head 14 and the inner face of the sleeve 12, respectively.

An additional circular ring 42 of rectangular cross-section rests loosely upon the upper convex face of the gasket ring 36 and serves as a bearing member between it and the lower ends of a second series of bolts 44, by which pressure is carried to said gasket ring. Referring still to Fig. 1, it will be seen that the bolts 44 are headed at their outer ends and are threaded through the bull ring 18 on a circumference which is outward with respect to the centers of bolts 30. The bolts 44 are preferably uniformly spaced intermediate the inner row of bolts 30. Note is also taken that the depending ends of the bolts 44 extend loosely through aligned holes 46 drilled through the intermediate thrust ring 16 and into engagement with the bearing ring 42.

Certain other significant details of construction will now be described briefly in relation to the principal elements of the closure combination. The intermediate ring 16 conveniently has the same outer diameter as the overlying bull ring 18 and is also conveniently divided for assembly purposes into the same number of segments by the parallel pairs of cross-sectional cuts 48, 50 and 52, 54. A lower shoulder 56 of the same width as thrust shoulder 21 also extends inwardly of the sleeve 12, the portion thereof between the two shoulders being cylindrical to receive the outermost lateral faces of the rings 16 and 18. The shoulder 56 lies in the same plane as the circumferential shoulder 32 of the head member 14 when the latter is in engagement with the lowermost shoulder 34 of the sleeve 12; together they receive the downward pressure of the bolts 30 and prevent tipping of the intermediate ring 16.

Immediately below the ring 16, an annular recess 58 is provided between the sleeve 12 and the head 14 for receiving the bearing ring 42 and the gasket ring 36. The recess 58 is tapered at the bottom (as seen in Fig. 1) by reason of the inclined surface of the sleeve 12 just above its shoulder 40 and an opposed inclined lateral surface on the cover 14 above the continuous horizontal shoulder 38.

With respect to the materials to be used for the different members of the closure combination, it will be appreciated by those versed in the art that suitably treated steel or alloy steel preferably will be employed throughout. Pressures of the order of 500 pounds per square inch and upward are contemplated for the vessel 10. The maximum pressure and the nature of the fluid medium in the vessel dictate the selection of materials and proportions.

Further details of the operation of this invention will be brought out in the following explanation of the way in which the principal embodiment is assembled. The cover 14 is inserted within the sleeve 12 until it stops in face-to-face engagement with the shoulder 34. Next the gasket 36 and its bearing ring 42 are placed within the recess 58 in the order enumerated. The intermediate thrust ring 16 and the bull ring 18 will then be placed in operative position over the head 14 and within the sleeve extension 12. It will be plainly seen that the direction of the parallel slots in the respective rings, 16 and 18, will determine the order of assembly of their segments (see Fig. 2).

Preliminarily, the intermediate ring 16 will rest in loose engagement with the flat continuous shoulder 32 on the top of head 14 and the shoulder 56 of the sleeve 12. After the cover bolts 30, 30 are threaded into the bull ring 18 in the manner which has been described, they will be tightened up uniformly so as to tightly engage the intermediate ring 16 with the top of cover 14 and the bottom of cover 14 with the shoulder 34. Consequently, the shoulder or flange 20 of the upper or bull ring 18 will be elevated against the inwardly extending thrust shoulder 21 of the sleeve 12 as the bolts 30 separate it from the intermediate ring 16. The closure structure is thus conditioned to resist the upward thrust of the pressure fluid within the vessel 10.

A fluid-tight seal requires the co-operation of the gasket 36. By tightening the separate series of bolts 44, which act on the bearing ring 42, the gasket ring will be forced to the converging bottom of the annular recess 58 and will be sealed at its edges with great pressure by the flattening action thereon, an action like that of a toggle mechanism. The fit between the sleeve 12 and head 14 will be such as to accommodate expansion of the latter in response to the heat of the pressure fluid.

By these means the upward thrust on the closure 14 is taken entirely by the head bolts 30 and the gasket is held entirely by bolts 44. The thrust shoulder 34 of the sleeve 12 is of sufficient depth to withstand the combined shearing forces due to the bolt pressure and the gasket ring sealing reaction.

In the modification of this invention shown in Figs. 3, 4 and 5, a uniformly spaced, circumferential set of detachable lugs 63 takes the whole pressure load which is carried by the thrust shoulder 21 in the principal form. Only a discussion of differences will be required for an understanding of the modifications comprehended by this invention. The lugs 63 each comprises a cylindrical portion 64 and an integral rectangular block portion 65 which have eccentrically disposed axes. Near its upper edge, the extension sleeve 74 is provided with a uniformly spaced circumferential series of circular openings 67, one of which is shown in Figs. 4 and 5. These openings or holes loosely receive the cylindrical portions 64 of the lugs 63, the portions 64 preferably being of the same approximate length as the openings 67 which extend through the sleeve 74.

The eccentric arrangement of cylindrical portion 64 and rectangular portion 65 provides an engagement with the interior of sleeve 74 (see Fig. 4) which resists bending of the lugs 63 or any tendency thereof to be pulled inward.

Also the pivot joint between cylindrical portion 64 and sleeve 74 permits the rectangular block portions of 65 of the lugs 63 to shift with bull ring 80 so as to remain in full face-to-face engagement. It is unnecessary to use a shoulder such as 20 on the bull ring of this modified construction.

In Fig. 5 the bolts 44 have been turned down so as to compress gasket ring 36 and produce a fluid-tight seal.

There has been a slight rearrangement of parts in the further modification of Fig. 6. The intermediate ring (16) has been eliminated and a bull ring 81 provided next to a head 82. For this reason, it is possible to eliminate the flat shoulder (32) on the top of the head. As shown, the bolts 30 and 44 directly engage the head 82 and bearing ring 42, respectively. A short distance below its upper or outer edge, the sleeve 83 is provided on its inside with an annular channel 70 of rectangular cross section to receive a segmental, circular ring 72 of appreciably greater thickness than the depth of the channel and of somewhat lesser height than the width thereof. As seen in Fig. 6, the lower inner corner of the thrust ring 72 mates with a rectangular shoulder 84 extending around the upper face of the bull ring 81. When the gasket 36 and head 82 have been locked in their sealing positions, after the manner of Fig. 6, the thrust ring 72 will engage the upper side of the channel 70 and function in the way indicated for shoulder 21 or lug 63. In each form of the invention which has been described, both sets of bolts are threaded in the bull ring only, which requires that this ring be of substantial length so that the bolts can withstand their working loads.

In accordance with another modification of my invention, more particularly shown in Figures 7 and 8, I have provided a detachable cover which is suitably keyed to the shell or vessel. Such key construction permits quick detachability and assures a solid and secure structure when in place.

More specifically, the vessel or shell may be represented by the member 100 which is to be sealed by a closure member 102, which extends across the opening. For purpose of illustration, this closure member 102 is intended to be cylindrical and is provided with shoulders 102a, which rest on shoulders 100a, formed in the shell wall. The space between the side wall of the closure 102 and the shell wall 100 is to be sealed by a gasket 104. Such gasket is normally compressed by bolts 105 which engage the top of a ring 106 which ring is preferably rectangular in cross section and relatively deep as compared with its width. This assures a continuity of contact on the gasket 104, as the ring 106 acts as an effective beam between the bolts 105.

Bolts 105 are preferably screw threaded in a bull ring 107 which is held within the inner diameter of the shell 100 by a plurality of keys 108 as shown in Figure 7. These keys 108 are conveniently of a segmental type with a substantial portion being inserted into the shell wall and with the greatest extent place in shear as along the line 109. These keys are also suitably provided with slots 110 which co-operate with a second series of bolts 112 which bolts directly contact with the closure 102.

Under normal operations after the closure 102 has been put in place and the gasket 104 inserted in the channel between the closure and the shell wall, the ring 106 is put in place. Thereafter the bull ring 107 is inserted; such bull ring being provided with shoulders 107a which engage the center portion 102b projecting from the closure 102. The bull ring centers the closure 102.

Ordinarily, the keys 108 are carried by the bull ring 107 and bolts 112 with the lock nuts 113 loosened so that the keys can be withdrawn inwardly from the shell 100. When the bull ring is located in place, the keys may then be extended radially outward to engage the suitable recesses in the shell 100. Thereafter the bolts 112 can be tightened firmly holding closure 102 in place. When so located the lock nuts 113 can be screwed tight to prevent withdrawal of the keys 108. The bolts 105 are then inserted through the openings in the keys and into the proper threaded portion of the bull ring 107 and the gasket 104 is made tight.

It will be appreciated that the bolts 112 are primarily for the purpose of restraining movement of the closure 102. The load is directly carried by the continuous bull ring 107 and the keys 108 and there is no tendency of the bull ring 107 to cant as it engages the vertically projected boss on the closure 102. It will also be apparent that the bolts 105 will positively expand the gasket 104 into sealing position and there can be no confusion as to partial loading of separate elements. Such structure is especially suitable for extremely high pressure constructions and where dangerous gases are to be confined.

While I have shown and described a preferred form of embodiment of my invention, I am aware that modifications may be made thereto and I therefore desire a broad interpretation of my invention, within the scope and spirit of the description herein, and of the claims appended hereinafter.

I claim:

1. A pressure vessel having an opening therein, a cover for said opening, said cover being of smaller diameter than said opening and adapted to fit therein, said vessel having a cover support adjacent said opening, against which said cover is adapted to rest, a gasket to seal said cover with respect to the vessel adjacent said opening, means to fasten said cover with respect to said support, said fastening means including a multiple segment member surmounting said cover and having key portions extending radially into the wall of said opening and resisting outward movement of the cover by shear, members adjustably carried by said multiple segment member and reacting with said cover whereby on adjustment thereof the cover may be fastened in the desired position, and supplemental adjustable means carried by said fastening means and independently forcing said gasket into a sealing relation.

2. A pressure vessel having an opening in the wall thereof, which opening is substantially circular, the walls surrounding said openings having a plurality of stepped shoulders formed by axially extending portions of decreasing diameter extending inwardly along the wall, a cover for said opening of smaller diameter than one of the portions of the vessel wall and adapted to rest on the shoulder formed by the edge of the adjacent portion, said cover having a peripheral shoulder on the outer side thereof, said cover shoulder and an adjacent wall shoulder forming an annular recess, an annular gasket in said recess engaging the shoulder on said cover and the adjacent shoulder on the wall, and detachable retaining means for said cover and said gasket, said retaining means including segmental portions having an effective diameter greater than the minimum diameter of the vessel opening and being in shear relation with an internal shoulder on the wall adjacent the opening, adjustable members extending through said retaining means, certain of said adjustable members engaging said cover and holding said cover against its supporting shoulder, and other of said adjustable members exclusively forcing said gasket into sealing position.

3. A pressure vessel having a substantially circular opening, a cover for said opening, said cover being of smaller diameter than said opening, said vessel having an interior support for said cover, said cover having a peripheral shoulder on the outer side thereof, a gasket of relatively thin metal and of arcuate cross section fitting within said shoulder with one edge engaging the vessel adjacent the opening, means to fasten said cover with respect to said supporting means, said fastening means including a plurality of detachable members secured to the vessel around the periphery of the opening, said fastening means having a shear connection with the vessel, adjustable members carried by said detachable members and reacting with said cover whereby on adjustment thereof the cover may be fastened in a desired position, and separate adjustable members also carried by the detachable members reacting through said vessel and tending to reduce the arcuity of the gasket for independent sealing relation thereof.

4. A pressure vessel as claimed in claim 2 in which the gasket is of relatively thin metal of arcuate cross section, and a separate load distributing bar is interposed between said gasket and said gasket sealing members whereby a uniform sealing load is interposed at and between the contacting points.

5. A pressure vessel as claimed in claim 2 in which the retaining means includes a plurality of keys having spaced radial sides and internal slots, said slots surrounding certain of the adjustable members whereby said keys may be drawn radially inward to free the cover from the vessel wall, said keys and the adjustable members surrounded by the slots being removable as a unit with the retaining means.

6. A pressure vessel having an opening in the wall thereof, which opening is substantially circular, the walls surrounding said opening having a plurality of stepped shoulders formed by axially extending portions of different diameter, a cover for said opening of smaller diameter than one of the portions of the vessel wall and adapted to rest on the shoulder formed by the edge of an adjacent portion, said cover having a peripheral shoulder on the outer side, said cover shoulder and an adjacent wall shoulder forming an annular recess, an annular metallic gasket of arcuate cross section within said recess with its edges engaging the cover and the vessel wall, a load distributing bar mounted on said gacket, and retaining means for said cover and said gasket, said retaining means including a continuous ring surmounting said cover and said load distributing bar, a plurality of segmental members on said continuous ring, the outer edges of said segmental members being adapted to extend within a recess in the wall of the opening, a plurality of adjustable members, adjustably carried by said continuous ring, certain of said adjustable members engaging the cover and other of said adjustable members engaging the load distributing bar, said segmental members being slotted with the slots surrounding certain of the adjustable members and adjustably secured to said continuous ring whereby the said segmental members may be withdrawn from the vessel wall and removed as a unit with the adjustable members which are surrounded by the slots and the continuous ring.

GEORGE T. JACOCKS.